US006320868B1

(12) United States Patent
Okano et al.

(10) Patent No.: US 6,320,868 B1
(45) Date of Patent: Nov. 20, 2001

(54) TRANSMISSION/RECEPTION SYSTEM AND RECEIVER

(75) Inventors: Hiroshi Okano, Tokyo; Masao Kawamura, Akiruno, both of (JP)

(73) Assignee: Casio Computer Co., Ltd., Tokyo (JP)

(*) Notice: Subject to any disclaimer, the term of this patent is extended or adjusted under 35 U.S.C. 154(b) by 0 days.

(21) Appl. No.: 09/047,694

(22) Filed: Mar. 25, 1998

(30) Foreign Application Priority Data

Mar. 28, 1997 (JP) .................................................. 9-095325

(51) Int. Cl.[7] .................................................... H04B 7/212

(52) U.S. Cl. .......................... 370/442; 370/310; 370/328; 463/40; 463/42

(58) Field of Search .................................... 370/310, 442, 370/431, 449, 458, 462, 463, 464, 465, 474, 475, 476, 486, 498, 901, 908, 916, 311, 312, 313, 314, 328, 329, 338, 340, 351; 455/403, 412, 31.1, 31.2; 345/133, 141, 902, 961, 965; 463/40, 41, 42

(56) References Cited

U.S. PATENT DOCUMENTS 4,034,983 * 7/1977 Dash et al. ......................... 273/85 R
4,403,344 * 9/1983 Yamada et al. ....................... 455/181
5,619,361 * 4/1997 Sagesaka et al. ..................... 359/172
5,697,844 * 12/1997 Von Kohorn ......................... 370/310
5,699,357 * 12/1997 Carvey ................................. 370/347
5,735,744 * 4/1998 Okamoto ................................ 463/40
5,999,808 * 12/1999 LaDue .................................. 455/412

* cited by examiner

*Primary Examiner*—Douglas Olms
*Assistant Examiner*—Ricardo M. Pizarro
(74) *Attorney, Agent, or Firm*—Frishauf, Holtz, Goodman, Langer & Chick, P.C.

(57) ABSTRACT

A transmitting station transmits FM radio waves which carry program information, such as news, and time information representing the current time. Each of receivers generates the first time information in accordance with an internal clock, corrects the first time information in accordance with the time information transmitted from the transmitting station, and generates the second time information. Each receiver progresses a game by changing the image displayed on the display, in accordance with a predetermined element, which is obtained from the program information transmitted from the transmitting station, and the first or second time information. Therefore, the progress of the game differs depending on the reception of the second information and the time information, and accordingly the progress of the game is unexpectable.

18 Claims, 10 Drawing Sheets

TRANSMISSION/RECEPTION SYSTEM AND RECEIVER

BACKGROUND OF THE INVENTION

1. Field of the Invention

The present invention relates to a transmission/reception system and receivers that display information and a game, the progress of which changes in accordance with the state of the reception of information by radio.

2. Description of the Related Art (1) FM Teletext Broadcasting

The FM broadcasting radio waves on which display information such as letters and numerals have been multiplexed are received from an FM broadcasting station. The information such as letters and numerals are separated from the FM broadcasting radio waves, and are displayed on a display like a liquid crystal display:--; and (2) Pager Pagers are known as beepers. Not only a paging function and a message display function, but also the information service of displaying a weather forecast and ticket information, etc. have been brought into practice for pagers. Pagers between which "fixed phrases" can be exchanged have also been devised. When one pager receives a message representing the sender's happy feeling from another pager, it displays the illustration of a smiling face. When the pager receives a message representing the sender's sad feeling, it displays the illustration of a crying face.

(3) Pet Games

Pet games are executed by the software incorporated in personal computers or by downloaded software, and animals like a tropical fish, etc. are displayed.

(4) Confrontation Type Game Dedicated Machines

With one game machine or a plurality of game machines connected to each other, players execute a game and match game characters against each other on the screen by operating their respective pads.

(5) Personal Computer Online Game

Personal computers are connected to each other via a telephone line, and users play a match on the screens of their respective computers by operating keys or mice.

(6) Portable Game Machines

The game machines store programs for one-man playable games or pet games. Players proceed with games by operating keys, or raise electronic pets and grow them in a plurality of patterns in accordance with the lapse of time, while taking care of the pets by operating keys.

(7) Game Utilizing a PHS

Portable game functions are incorporated in PHS terminals, and users raise electronic pets on the display screens of their respective PHS terminals. Each user can transmit his/her grown pet from his/her PHS terminal to another PHS terminal, which can display the electronic pet as transmitted.

In the above-described related art, the FM teletext broadcasting is a technique for receiving the information transmitted from the FM broadcasting station and displaying the information on a display. The information as displayed can satisfy the users' desires for intelligence. However, the usability of the displayed information as a game is low, and accordingly such information cannot satisfy the users' desires for play. This problem also occurs in the case of "pagers". Pagers can satisfy the users' desires for information like a weather forecast, ticket information, etc. However, the users' desires for play are hardly satisfied with the display of fixed phrases and illustrations. In contrast, the "pet game", the "confrontation type game dedicated machines", the "personal computer online game", the "portable game machine" and the "game utilizing the PHS" can excite the uses' desires for play, because they aim at games. However, they cannot satisfy even the users' desires for information.

Let it be considered the capability of the "pet game" to excite the users' desires for play. Even whether the "pet game" is played with purchased software or with downloaded software, the state of growth changes within the range of the program of the currently used software. Under this condition, the excitement or effect which the "pet game" can induce over the users' desires for play has a limit, and the users cannot experience permanent excitement from the "pet game". Moreover, in the case of the "confront type game dedicated machines" and the "personal computer online game", a player cannot play them without another player as a rival. If a player could play the above games without a rival, the degree of the excitement would be low.

Meanwhile, in the case of the "portable game machines", those machines are programmed on the precondition that a player plays the game by himself/herself, and therefore can assuredly excite the users' desires for play, irrespective of external conditions such as the presence/absence of a rival. However, in the case of the "portable game machines", as well as in the case of the "pet game", the state of the game and the state of growth change sorely within the range of the program. Under this condition, there is a limit on the excitement or effect on the user's desires for play.

Even if the state of the growth of a pet and the process of the growth were to change variously depending upon a user's operation to bring up the pet and even if it was impossible for a user to expect the condition and process of the growth of the pet, this would be due to a program having a large number of branches corresponding to operations for bringing up the pet, and the pet would grow up merely in accordance with the program. Thus, as well as in the above-described cases, the excitement or effect on the users' desires for play has a limit, and the users hardly experience permanent excitement from the "portable game machines".

In the case of the "game utilizing the PHS", a pet which has been brought up in one PHS terminal can be transmitted to another PHS terminal. This seems that the utility value of the game has been improved. However, the pet itself merely grows up in accordance with a program as mentioned previously, and the excitement which the users experience from the transmission of the pet is fleeting. Such a game hardly satisfies the users' desires for play permanently.

SUMMARY OF THE INVENTION

The present invention has been made in consideration of the above drawbacks, and it is an object of the present invention to provide a transmission/reception system and receivers which can assuredly and permanently excite the users' desires for intelligence and play.

According to the first aspect of the present invention having the above-described object, there is provided a transmission/reception system comprising:

- a transmitting station which transmits radio waves carrying first information, second information and information representing time; and
- at least one receiver which receives the radio waves transmitted from said transmitting station and demodulates said first information, said second information and said information representing time, said at least one receiver including a display, a time counter which generates first time information in response to an internal clock signal, a corrector which corrects the first time information generated by said time counter, in accordance with the received information representing time, and generates second time information, and a game controller;

wherein said game controller progresses said game by changing the image displayed on said display means, in accordance with a predetermined element obtained from the received second information, and time information, such that a state of the progress of said game varies in accordance with a state of the reception of said second information and said time information.

According to the above-described structure, the transmitting station transmits the radio waves carrying the first information, the second information and the information representing time. Meanwhile, in the receiver, the time counter generates the first time information, and the corrector corrects the first information in accordance with the information representing time and transmitted from the transmitting station, and generates the second time information. Thus, the first time information and the second information exist in the receiver as the time information. Moreover, in the receiver, the game controller progresses the game by changing the image displayed on the display, in accordance with the predetermined element and the time information (based on the first time information and the second time information).

The predetermined element is one obtained from the second information transmitted from the transmitting station. Therefore, the state of the progress of the game differs depending on the state of the reception of the second information, in other words, depending on whether the second information is received or not, and accordingly the user cannot expect how the game will progress. Furthermore, the state of the progress of the game varies not only in accordance with the second information from which the aforementioned predetermined element is obtained, but also in accordance with the time information. It is not expectable how the game will progress, and the state of the progress of the game varies also in accordance with the passage of time. This assuredly and permanently excites the user's desires for play. The transmitting station transmits not only the second information used to advance the game, but also the first information. By virtue of the transmission of the first information, the user's desires for intelligence can be permanently excited. Thus, the user's desires for both intelligence and play can be permanently excited.

According to the second aspect of the present invention, there is provided a transmission/reception system comprising:

a transmitting station which transmits radio waves carrying first information, second information and information representing time; and at least one receiver which receives the radio waves transmitted from said transmitting station and demodulates said first information, said second information and said information representing time, said at least one receiver including display means for displaying an image, time counting means for generating first time information in response to an internal clock signal, correction means for correcting the first time information generated by said time counting means, in accordance with the received information representing time, and for generating second time information, and display control means for controlling said display means;

wherein said display control means changes the image displayed on said display means, in accordance with a predetermined element obtained from the received second information, and time information, such that a state of the image displayed on said display means varies in accordance with a state of the reception of said second information and said time information.

According to the above-described structure, the transmitting station transmits the radio waves carrying the first information, the second information and the information representing time, as in the above-described case. Meanwhile, in the receiver, the time counting means generates the first time information, and the correction means corrects the first time information in accordance with the information representing time and transmitted from the transmitting station, and generates the second time information. Thus, the first time information and the second time information exist in the receiver as the time information. Furthermore, in the receiver, the display control means changes the image displayed on the display means, in accordance with the predetermined element and the time information (based on the first time information and the second time information).

The aforementioned predetermined element is obtained from the second information transmitted from the transmitting station. Therefore, the state of the image displayed on the display means differs depending on the state of the reception of the second information, in other words, depending on whether the second information is received or not, and the user cannot expect in what state the image will be displayed. The display control information changes the state of the image displayed on the display means, not only in accordance with the second information from which the predetermined element is obtained, but also in accordance with the time information. It is not expectable in what state the image will be displayed on the display means, and the state of the image displayed on the display means will vary also in accordance with the passage of time. This assuredly and permanently excites the user' s desires for play. The transmitting station transmits not only the second information used to display the image, but also the first information. By virtue of the transmission of the first information, the user's desires for intelligence can be permanently excited. Thus, the user's desires for both intelligence and play can be permanently excited.

In the above-described transmission/reception system, the time information may be the first time information. In this case, the game means or display control means of the receiver changes the image displayed on the display means, in accordance with the time information (i.e., the first time information generated by the time counting means which operates based on a clock signal within the receiver) and the element obtained from the second information. A plurality of receivers, each including the game means or the display control means, change the images displayed on their respective display means, in accordance with the peculiar first time information which differs depending on the receivers. The receivers of users change the images displayed on their respective display means with originality. The users or friends, if they show the images displayed on the display means of their receivers to each other, can play with pleasure.

In the above-described transmission/reception system, the time information may be the second time information. In this case, the game means or display control means of the receiver changes the image displayed on the display means, in accordance with the time information (i.e., the second time information generated by the time counting means which operates based on a clock signal within the receiver) and the element obtained from the second information. The second time information is accurate time information obtained by correcting the first time information in accordance with the information representing time and carried by the radio waves. A plurality of receivers, each including the game means or the display control means, simultaneously change the images displayed on their respective display means, in accordance with the second time information common to the receivers. Since the receivers of users change the images displayed on their respective display means in accordance with the common time information and in synchronization with each other, the users can play the game while advancing the game simultaneously.

In the above-described transmission/reception system, the radio waves may be FM radio waves, and the first information, the second information and the information representing time may be multiplexed on the FM radio waves. When the first information is character information multiplexed on the FM radio waves and when the second information is a parameter or the like which is used in the game and the control of the display, the users' desires for intelligence can be satisfied by the character information, while the users' desires for play can be satisfied by the game and the control of the display.

In the above-described transmission/reception system, the transmitting station may have a service center and can receive the first information and the second information from the service center. In this case, the service center generates the first information, such as the character information, and the second information used in the game and the control of the display. The transmitting station receives the first information and the second information from the service center, and transmits them. By employing the service center which generates the first information and the second information, the transmission/reception system of the present invention can be established using preexisting transmission equipment.

In the above-described transmission/reception system, the receiver(s) may further include means for sending reply information to the service center. By sending the reply information to the service center in accordance with changes in the progress of the game or the displayed image, the game can be progressed and the display of the image can be performed in the form of a dialogue with the service center.

In the above-described transmission/reception system, the number of receivers may be plural, and the transmitting station may receive from one receiver the second information generated thereby and may transmit the second information to another receiver. In this case, the state of the image displayed on the receiver which receives the second information from the transmitting station varies according to the contents and generation frequency of the second information generated by another receiver. For example, a pet displayed on the display means of one receiver gradually becomes thin in accordance with the lapse of time based on the time information when the frequency of the transmission of the second information from another pager is low.

In the above-described transmission/reception system, the transmitting station may be an FM radio broadcasting station, the receiver may be an FM teletext broadcast receiver, and the first information may represent an FM teletext information program. In this system, not only the FM broadcasting and the display of a multiplex information program are performed, but also the state of the image displayed on the display means is changed in accordance with the state of the reception of the second information and the time information. Therefore, a new service can be realized in the FM teletext broadcasting, and the commercial value of the FM teletext broadcast receiver is improved.

In the above-described transmission/reception system, the receiver may be a pager, the transmitting station may transmit the radio waves to the pager, and the first information may represent a paging message. In this case, the transmitting station transmits the radio waves which carry, together with the paging message, the second information and the information representing time. The pager/receiver, which has received the paging message, the second information and the information representing time, not only displays the paging message, but also changes the state of the image displayed on the display means, in accordance with the state of the reception of the second information and the time information. Thus, a new service is realized in the pager system, and as a result, the commercial value of the pager/receiver is improved.

In the above-described transmission/reception system, the first information may be pay information. The second information may be pay information. The first information may be free information, whereas the second information may be pay information. Depending on whether the user pays charges or not, the receiver of the user can receive only the first information, or only the second information, or both of the first and second information. In this transmission/reception system, the receiver functions only as an information device, or functions only as a game device, or functions as both an information device and a game device. The user can make the receiver function according to his/her tastes.

In the above-described transmission/reception system, the receiver(s) may further include key input means for inputting an element which changes the state of the progress of the game. The state of the progress of the game and the state of the image displayed on the display means vary not only in accordance with the state of the reception of the second information and the time information, but also in accordance with the key input operation which each user performs with the key input means. The state of the progress of the game and the state of the image displayed on the display means vary with originality due to the key input operation performed by each user. This further satisfies the users' desires for play.

According to the third aspect of the present invention, there is provided a transmission/reception system comprising:

a transmitting station which transmits radio waves carrying program information; and a receiver which receives the radio waves transmitted from said transmitting station and demodulates said program information, said receiver including
display means for displaying an image, and
game means for performing a game;

wherein said game means progresses said game by changing the image displayed on said display means, in accordance with a predetermined element obtained from the received program information, and time information, such that a state of the progress of said game varies in accordance with a state of the reception of said program information and said time information.

In the above-described transmission/reception system, the state of the progress of the game varies depending on whether the receiver receives the program information or not. In the case where the number of receivers is plural, a difference occurs in the progress of the game between one receiver, which receives the program information frequently, and another receiver which does not receive the program information frequently. When the reception of the program information and the progress of the game are thus connected with each other, not only the users of the receivers can enjoy the game while the game is progressing differently depending on the receivers, but also the user who does not frequently receive the program information with his/her receiver can be stimulated to receive the program information more frequently.

In the above-described transmission/reception system, the state of the reception of the program information may differ depending on which of a plurality of programs is received by the receiver. Specifically, in the case of this transmission/reception system, the state of the progress of the game varies depending on what type of program information the receiver receives. When the user often receives news program information with his/her receiver, the image as displayed changes into such a form as exhibiting a serious character. When the user often receives sports program information with his/her receiver, for example, the image as displayed changes into such a form as exhibiting a strong character. Thus, the user's taste for the program information can be reflected on the progress of the game.

In the above-described transmission/reception system, the state of the reception of the program information may differ depending on a time at which the program information has been received by the receiver. In the case of this transmission/reception system, the progress of the game varies depending on what time the receiver receives the program information. For example, when the user often receives the program information late at night, the image as displayed changes into such a form as showing a cheerless character. When the user often receives the program information early in the morning, the image changes into such a form as showing a cheerful character. Thus, it is possible to have the progress of the game differ depending on when the user receives the program information with his/her receiver.

According to the fourth aspect of the present invention, there is provided a transmission/reception system comprising:

- a transmitting station which transmits radio waves carrying first information and second information; and
- a receiver which receives the radio waves transmitted from said transmitting station and demodulates said first information and said second information, said receiver including
  - a display, and
  - a game controller which progresses said game by changing the image displayed on said display, in accordance with a predetermined element obtained from the received second information, such that a state of the progress of said game varies in accordance with a state of the reception of said second information.

According to the above-described structure, the transmitting station transmits the radio waves carrying the first information and the second information. Meanwhile, in the receiver, the game controller progresses the game by changing the image displayed on the display, in accordance with the predetermined element. The predetermined element is one obtained from the second information transmitted from the transmitting station. Therefore, the state of the progress of the game differs depending on whether the second information is received or not, and accordingly the user cannot expect how the game will progress. This assuredly and permanently excites the user's desires for play. The transmitting station transmits not only the second information used to advance the game, but also the first information. By virtue of the transmission of the first information, the user's desires for intelligence can be permanently excited.

According to the fifth aspect of the present invention, there is provided a transmission/reception system comprising:

- a transmitting station which transmits radio waves carrying first information and second information; and
- a receiver which receives the radio waves transmitted from said transmitting station and demodulates said first information and said second information, said receiver including
  - display means for displaying an image, and
  - display control means for controlling said display means;
- wherein said display control means changes the image displayed on said display means, in accordance with a predetermined element obtained from the received second information, such that a state of the image displayed on said display means varies in accordance with a state of the reception of said second information.

According to the above-described structure, the transmitting station transmits the radio waves carrying the first information and the second information, as in the above-described case. Meanwhile, in the receiver, the display control means changes the image displayed on the display means, in accordance with the predetermined element. The aforementioned predetermined element is obtained from the second information transmitted from the transmitting station. Therefore, the state of the image displayed on the display means differs depending on whether the second information is received or not, and the user cannot expect in what state the image will be displayed. This assuredly and permanently excites the user's desires for play. The transmitting station transmits not only the second information used to display the image, but also the first information. By virtue of the transmission of the first information, the user's desires for intelligence can be permanently excited.

According to the sixth aspect of the present invention, there is provided a receiver comprising:

a demodulator which receives radio waves carrying first information, second information and information representing time, and demodulates said first information, said second information and said information representing time;

a display;

a time counter which generates first time information in response to an internal clock signal;

corrector which corrects the first time information generated by said time counting means, in accordance with the received information representing time, and generates second time information; and a game controller;

wherein said game controller progresses said game by changing the image displayed on said display, in accordance with a predetermined element obtained from the received second information, and time information, such that a state of the progress of said game varies in accordance with a state of the reception of said second information and said time information.

According to the above-described structure, the time counter generates the first time information, and the correction means corrects the first information in accordance with the information representing time and transmitted from the transmitting station, and generates the second time information. Thus, the first time information and the second information exist in the receiver as the time information. Moreover, in the receiver, the game controller progresses the game by changing the image displayed on the display, in accordance with the predetermined element and the time information (based on the first time information and the second time information). The predetermined element is one obtained from the second information transmitted from the transmitting station. Therefore, the state of the progress of the game differs depending on the state of the reception of the second information, in other words, depending on whether the second information is received or not, and accordingly the user cannot expect how the game will progress. Furthermore, the state of the progress of the game varies not only in accordance with the second information from which the aforementioned predetermined element is obtained, but also in accordance with the time information. It is not expectable how the game will progress, and the state of the progress of the game varies also in accordance with the passage of time. This assuredly and permanently excites the user's desires for play. Since the receiver receives also the first information, the user's desires for intelligence can also be permanently excited. Thus, the user's desires for both intelligence and play can be permanently excited.

The above-described receiver may further comprise a key input section which inputs an element which changes the state of the progress of the game. Therefore, the state of the progress of the game varies not only in accordance with the state of the reception of the second information and the time information, but also in accordance with the key input operation which each user performs with the key input section.

According to the seventh aspect of the present invention, there is provided a receiver comprising:

demodulation means for receiving radio waves carrying first information, second information and information representing time, and for demodulating said first information, said second information and said information representing time;

display means for displaying an image;

time counting means for generating first time information in response to an internal clock signal;

correction means for correcting the first time information generated by said time counting means, in accordance with the received information representing time, and for generating second time information; and display control means for controlling said display means;

wherein said display control means changes the image displayed on said display means, in accordance with a predetermined element obtained from the received second information, and time information, such that a state of the image displayed on said display means varies in accordance with a state of the reception of said second information and said time information.

According to the above-described structure, as in the above-described case, the time counting means generates the first time information, and the correction means corrects the first time information in accordance with the information representing time and transmitted from the transmitting station, and generates the second time information. Thus, the first time information and the second time information exist in the receiver as the time information. Furthermore, in the receiver, the display control means changes the image displayed on the display means, in accordance with the predetermined element and the time information (based on the first time information and the second time information). The aforementioned predetermined element is obtained from the second information transmitted from the transmitting station. Therefore, the state of the image displayed on the display means differs depending on whether the second information is received or not, and the user cannot expect in what state the image will be displayed. The display control information changes the state of the image displayed on the display means, not only in accordance with the second information from which the predetermined element is obtained, but also in accordance with the time information. It is not expectable in what state the image will be displayed on the display means, and the state of the image displayed on the display means will vary also in accordance with the passage of time. This assuredly and permanently excites the user's desires for play. The transmitting station transmits not only the second information used to display the image, but also the first information. By virtue of the transmission of the first information, the user's desires for intelligence can also be permanently excited.

According to the eighth aspect of the present invention, there is provided a receiver comprising:

demodulation means for receiving radio waves carrying predetermined information and information representing time, and for demodulating said predetermined information and said information representing time;

display means for displaying an image;

time counting means for generating first time information in response to an internal clock signal;

correction means for correcting the first time information generated by said time counting means, in accordance with the received information representing time, and for generating second time information; and display control means for controlling said display means;

wherein said display control means changes the image displayed on said display means, in accordance with a predetermined element obtained from the received predetermined information, and time information, such that a state of the image displayed on said display means varies in accordance with a state of the reception of said predetermined information and said time information.

In the above-described receiver, the state of the progress of the game varies depending on whether the receiver receives predetermined information or not. In the case where the number of receivers is plural, a difference occurs in the progress of the game between one receiver, which receives the predetermined information frequently, and another receiver which does not receive the predetermined information frequently. When the reception of the predetermined information and the progress of the game are thus connected with each other, not only the users of the receivers can enjoy the game while the game is progressing differently depending on the receivers, but also the user who does not frequently receive the predetermined information with his/her receiver can be stimulated to receive the predetermined information more frequently.

DETAILED DESCRIPTION OF THE PREFERRED EMBODIMENT

Figure 1A:
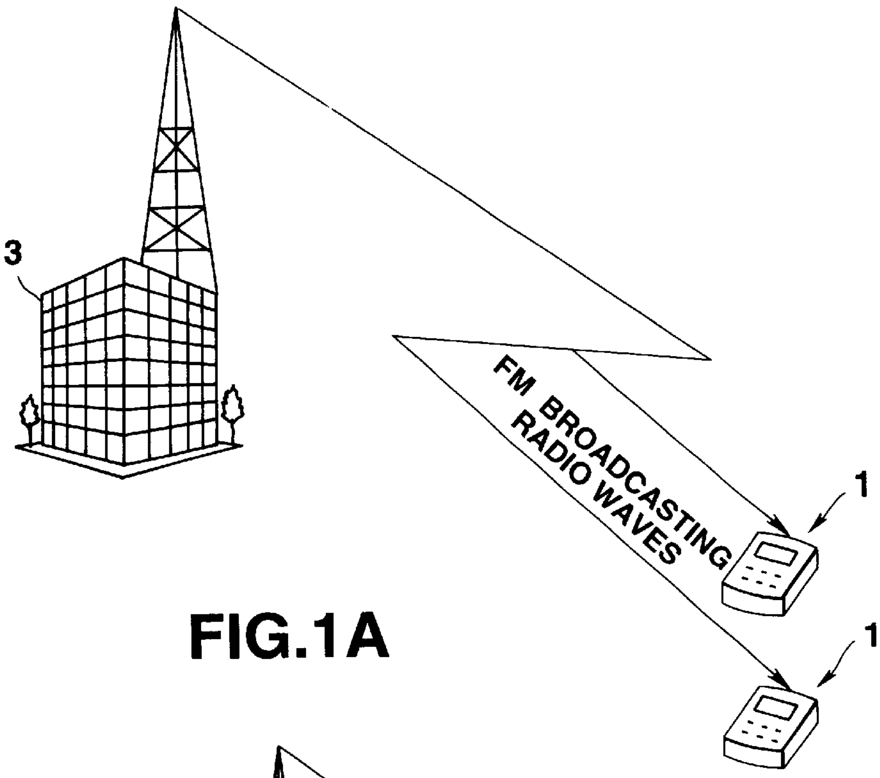
FIGS. 1(A) and 1(B) are diagrams showing the structures of systems according to an embodiment of the present invention.
Figure 1B:
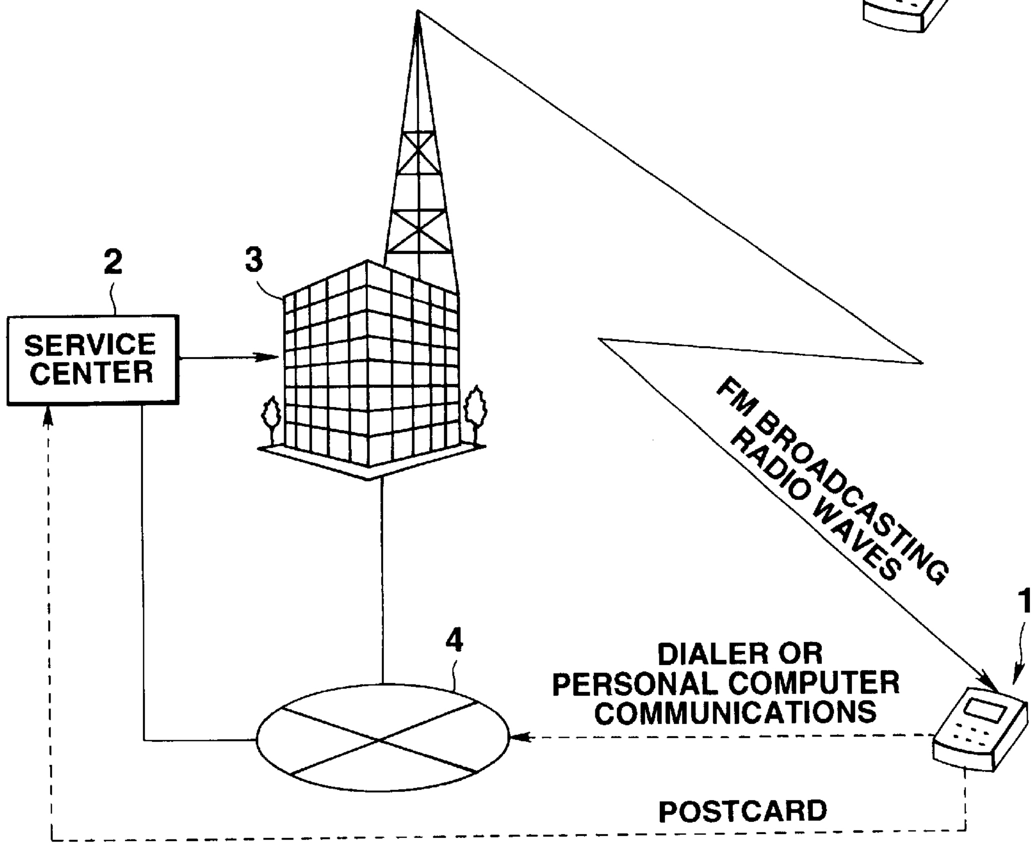

An embodiment of the present invention will now be described with reference to drawings. FIGS. 1A and 1B are diagram showing the structure of an FM teletext broadcasting system according to an embodiment of the present invention. As illustrated in FIG. 1(A), a transmission/reception system for the FM teletext broadcasting includes an FM broadcasting station 3 and receivers 1 which receive FM broadcasting radio waves from the FM broadcasting station 3. As illustrated in FIG. 1(B), the transmission/reception system may further include a service center 2. The service center 2 produces programs and game information, and sends them out to the broadcasting station 3 as multiplex information to be multiplexed on FM broadcasting radio waves. The FM broadcasting station 3 transmits the multiplex information together with the program produced by the FM broadcasting station 3, etc. The user of each receiver 1 can provide the service center 2 or the FM broadcasting station 3 with a reply to the game and the multiplex program through personal computer communications via a telephone line 4. It is also possible for the user of each receiver 1 to reply to the game and the multiplex program by means of postcards.

As described later, this invention may be applied to a paging system. In this case, the broadcasting station is replaced by a paging station, and the receiver 1 is comprised of a pager.

Figure 2:
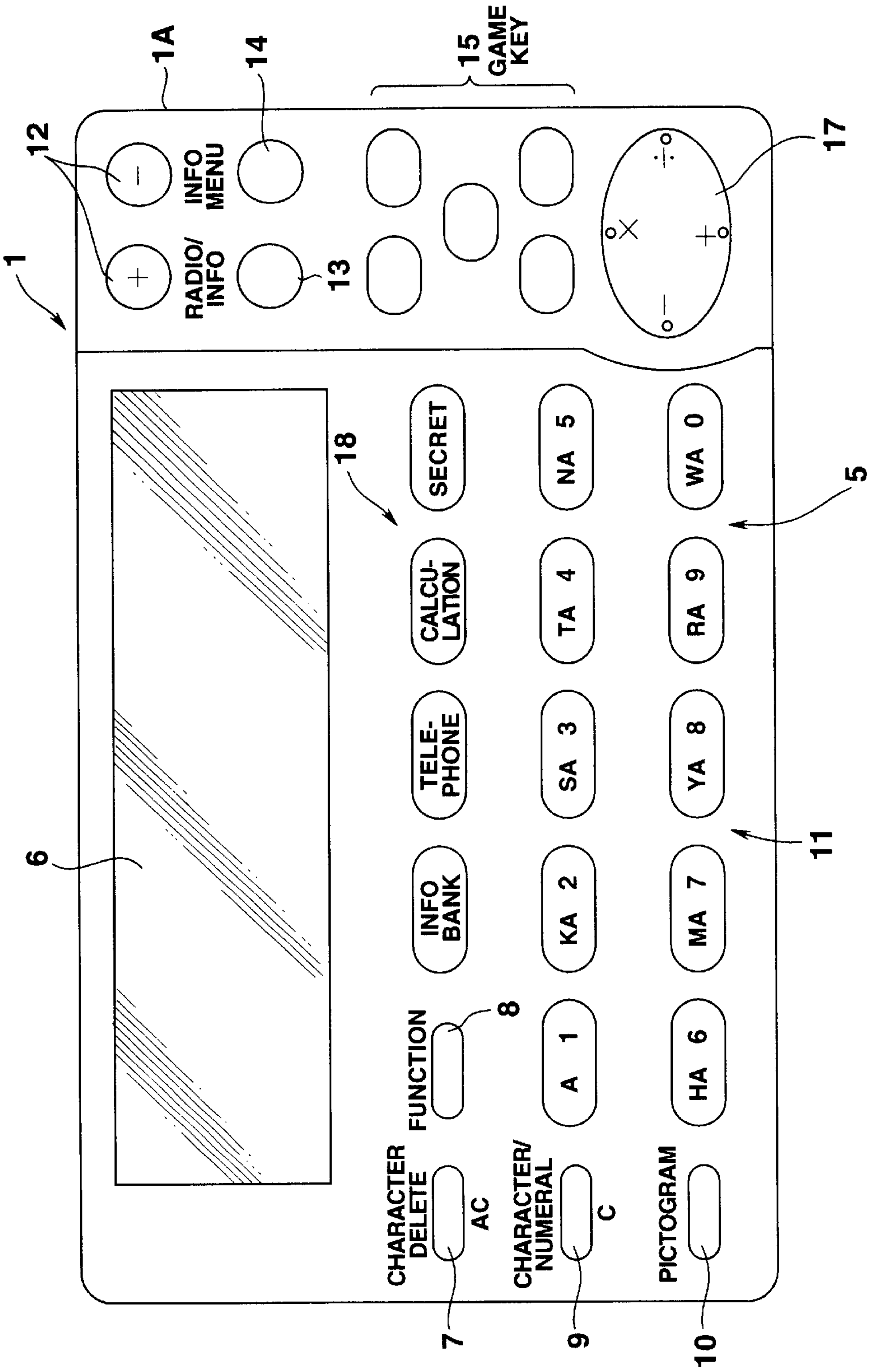
FIG. 2 is a diagram showing the appearance of a receiver.

As illustrated in FIG. 2, a key input section 5 and a display section 6 having an LCD (Liquid Crystal Display device) are provided on one face of an almost rectangular apparatus body 1A. For example, the left-hand portion of the display section 6 is used to display the multiplex information, while the right-hand portion of the display section 6 is used to display images for the game. The key input section 5 includes a Delete key 7, a Function key 8, a Character/Numeral key 9 for selecting characters/numerals, a Pictogram key 10, a set of Alphabet/Numeral keys for inputting an alphabet "A" to "Z" and numerals "1" to "0", a Tuning key 12 for turning broadcast radio waves, a Radio/Info key 13, an Info Menu key 14, Game keys 15, a Cursor key 17, a set of Mode keys 18 for selecting modes such as Info Bank, Telephone, Calculation, Secret, etc.

Figure 3:
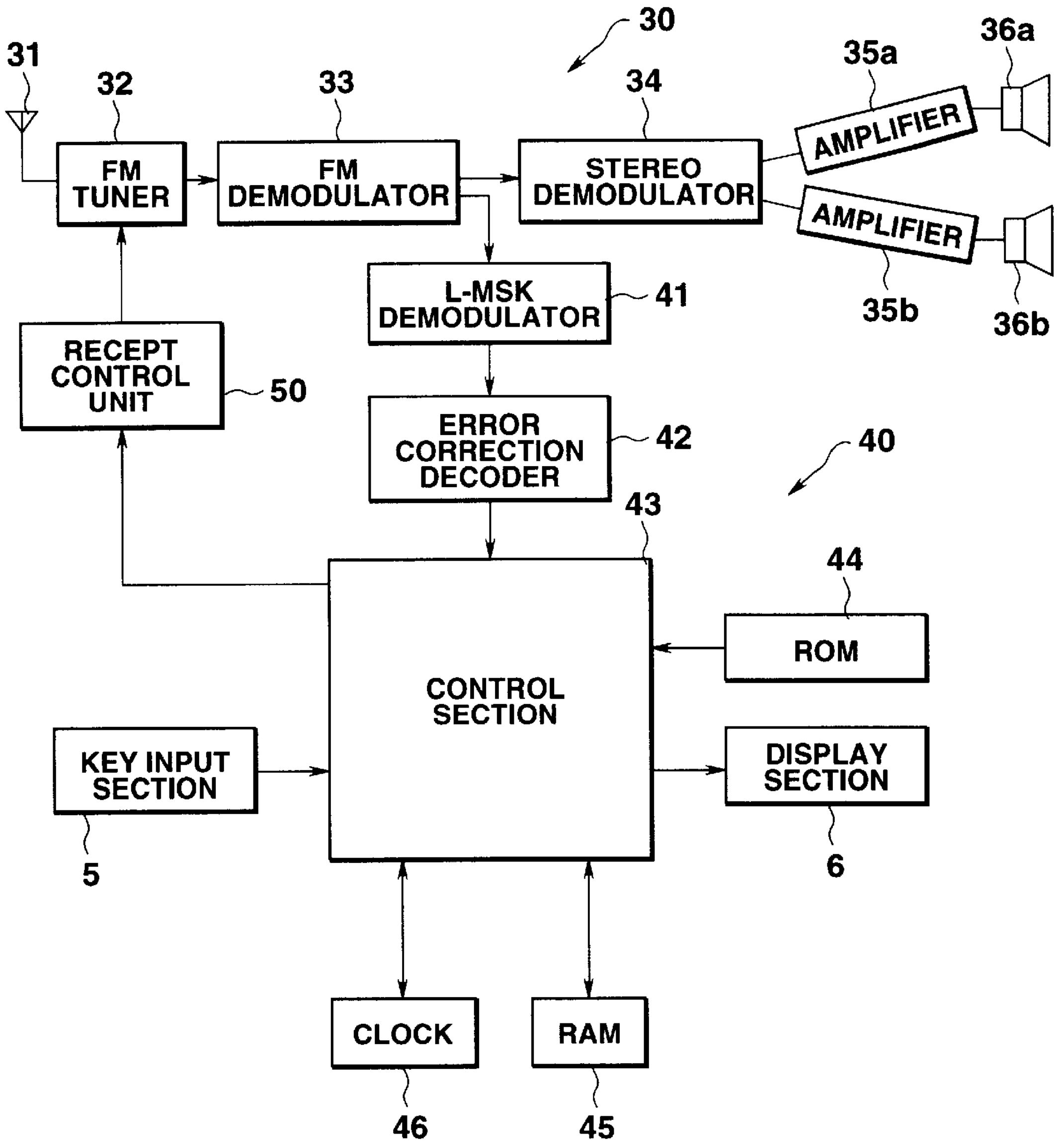
FIG. 3 is a block diagram illustrating the circuitry of the receiver.

FIG. 3 is a block diagram showing the structure of the receivers 1. Each receiver 1 has an FM radio section 30 for receiving FM broadcasting radio waves and generating corresponding voices, and a multiplex information reception section 40 for executing a variety of procedures involved in the reception of the pay/free multiplex information multiplexed on the FM broadcasting radio waves received by the FM radio section 30.

The FM radio section 30 includes an antenna 31 for receiving the FM broadcasting radio waves, an FM tuner 32 for turning the FM broadcasting radio waves, an FM demodulator 33 for demodulating an FM signal, a stereo demodulator 34 for changing the demodulated FM signal into stereo signals, a pair of amplifiers 35*a* and 35*b* for amplifying signals output from the stereo decoder 34, and a pair of speakers 36*a* and 36*b* for outputting the signals amplified by the amplifiers 35*a* and 35*b*. It is also possible for the users of the receivers 1 to listen to an FM stereo broadcast, with a stereo headphone being inserted in a stereo headphone jack (not shown).

The multiplex information reception section 40 includes an L-MSK (Level Controlled Minimum Shift Keying) demodulator 41 for performing the digital demodulation of changing the level of a multiplex signal by 4% to 10% and for separating from the FM broadcasting radio waves the multiplex information multiplexed thereon, an error correction decoder 42, and a control section 43. The control section 43 includes a micro-processor, and executes a variety of processes and a game process, with respect to the multiplex information as separated.

The control section 43 may include a communication functions such as a DTMF (Dual Tone Multifrequency), and a communication modem. When the control section 43 has the DTMF function, the control section 43 supplies a DTMF signal to the amplifiers 35*a* and 35*b* such that the speakers 36*a* and 36*b* generates a DTMF audio signal. Therefore, the control section 43 can transmit any data, for example, input through the key input section 5 to the broadcasting station 3. When the control section 43 has a modem, it transmits any data to the broadcasting station 3 through a commercial network or the Internet and so on.

Connected to the control section 43 are a ROM 44, a RAM 45, the key input section 5, the display section 6, a reception control section 50 for performing the reception tuning of the FM tuner 32 in accordance with the operation of the tuning key 12 provided in the key input section 5, and a time counter 46 for measuring the current time.

The ROM 44 includes, for example, a mask-ROM and a FLASH-ROM, and stores processing programs (computer programs). The control section 43 operates in accordance with the processing programs and realizes any function, which will be described later with reference to a flowchart. The ROM 44 stores, together with the processing programs, game functional formulas (function programs f(x), g(x) . . . ) corresponding to game arithmetic operation codes which will be described later when explaining the processing program, and is designed so that the functional formula corresponding to a received arithmetic operation code can be read out from the ROM 44.

The ROM 44 further stores pay/free information for restricting information receivable by this receiver 1. The pay/free information is preset in the ROM 44 by making a contract with the FM broadcasting station 3 and/or the service center 2. All or part of the ROM may be formed of a detachable memory such as an IC card which stores, for example, the pay/free information.

Figure 4:
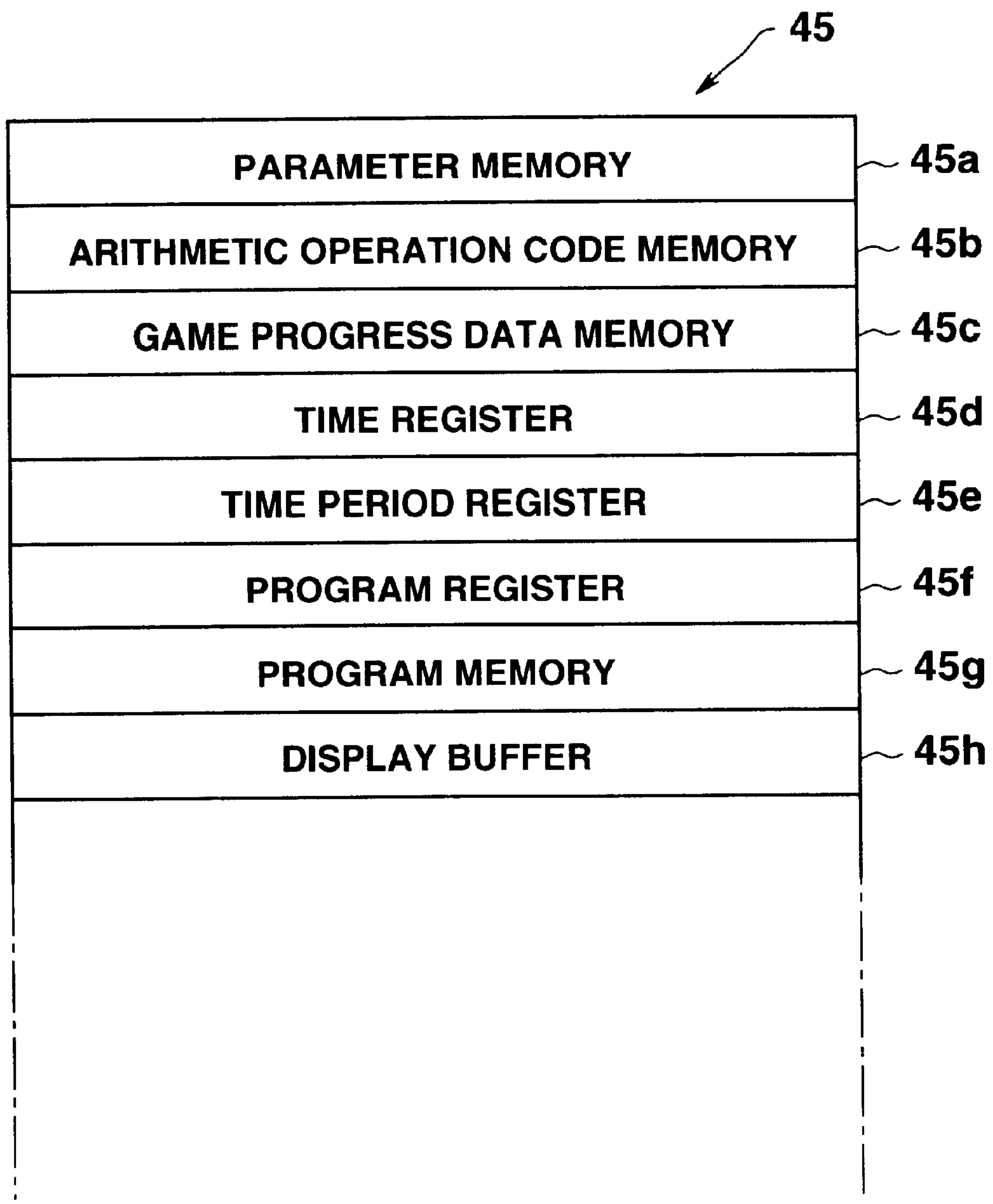
FIG. 4 is a diagram showing the structure of a RAM.

As illustrated in FIG. 4, the RAM 45 has a parameter memory 45*a,* an arithmetic operation code memory 45*b,* a game progress data memory 45*c,* a time register 45*d,* a time period register 45*e,* a program register 45*f,* a program memory 45*g,* a display buffer 45*h,* etc. The parameter memory 45*a* stores parameters used to advance a game, the arithmetic operation code memory 45*b* stores a code (an arithmetic operation code) representing a functional formula used to advance the game, and the game progress data memory 45*c* stores game data relating to a game during the game being executed. The time register 45*d* stores the time (time 1) counted by the time counter 46 and corrected in accordance with the time information sent from the FM broadcasting station 3. The time period register 45*e* stores the time interval (time 2) from when one of the Game keys 15 was operated up to when one of the Game keys 15 was again operated. The program register 45*f* sequentially stores the program information included in multiplex programs which are being received currently. Of the pieces of program information stored in the program register 45*f*, one designated by the user is stored in the program memory 45*g*. The display buffer 45*h* stores the multiplex program display data and game display data to be displayed on the display section 6.

Figure 5:
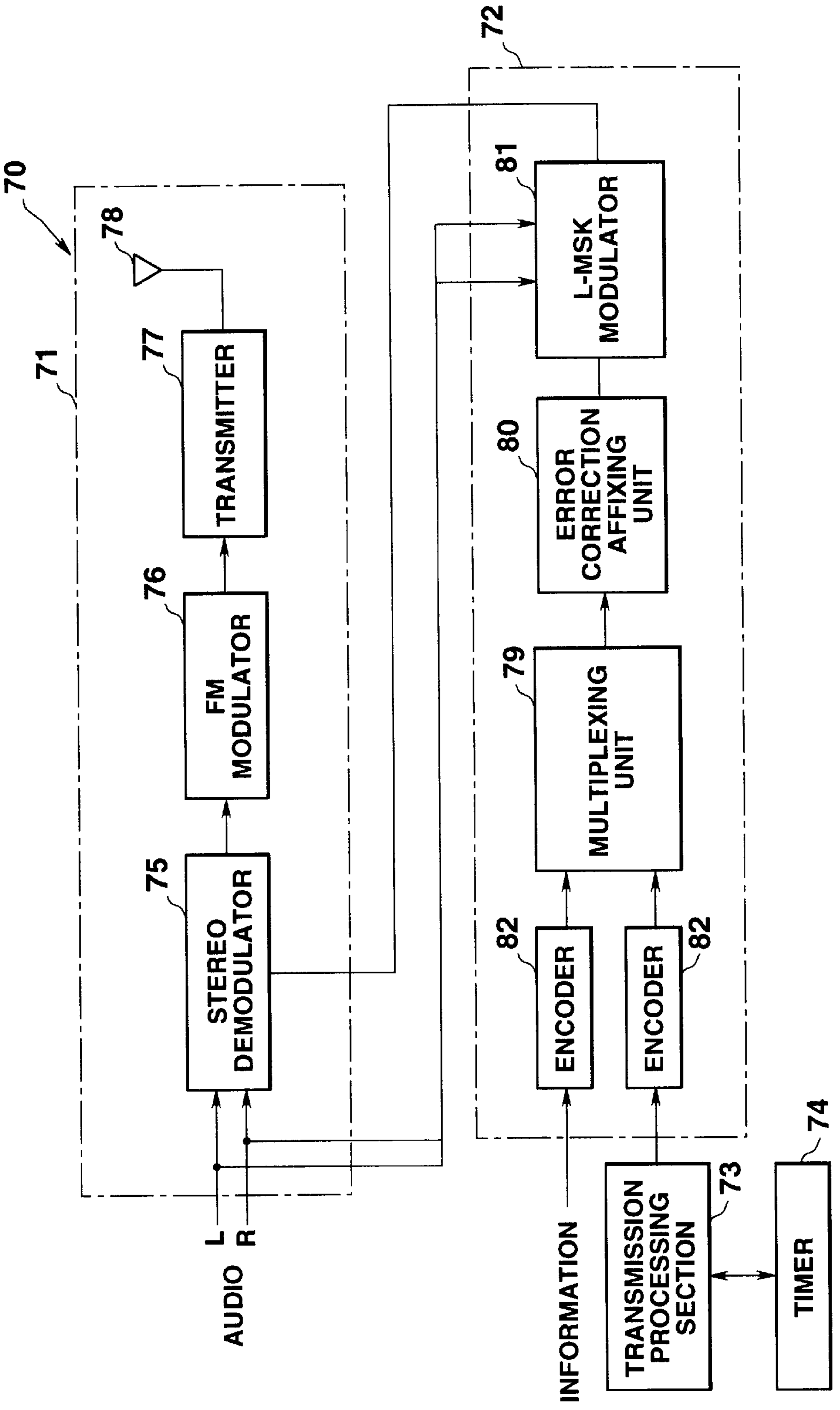
FIG. 5 is a block diagram showing the circuitry of a transmitter in an FM broadcasting station.

FIG. 5 shows a multiplex information transmission apparatus 70 arranged in the FM broadcasting station 3. The multiplex information transmission apparatus 70 includes a transmission section 71, a multiplexing section 72, a transmission processing section 73, and a timer 74 for generating time data representing data representing year, month, day and time. The transmission section 71 includes a stereo modulator 75 for performing the stereo modulation of audio signals, an FM modulator 76, a transmitter 77 and a transmission antenna 78. The multiplexing section 72 has encoders 82, a multiplexing unit 79, an error correction affixing unit 80 and an L-MSK modulator 81.

Figure 6:
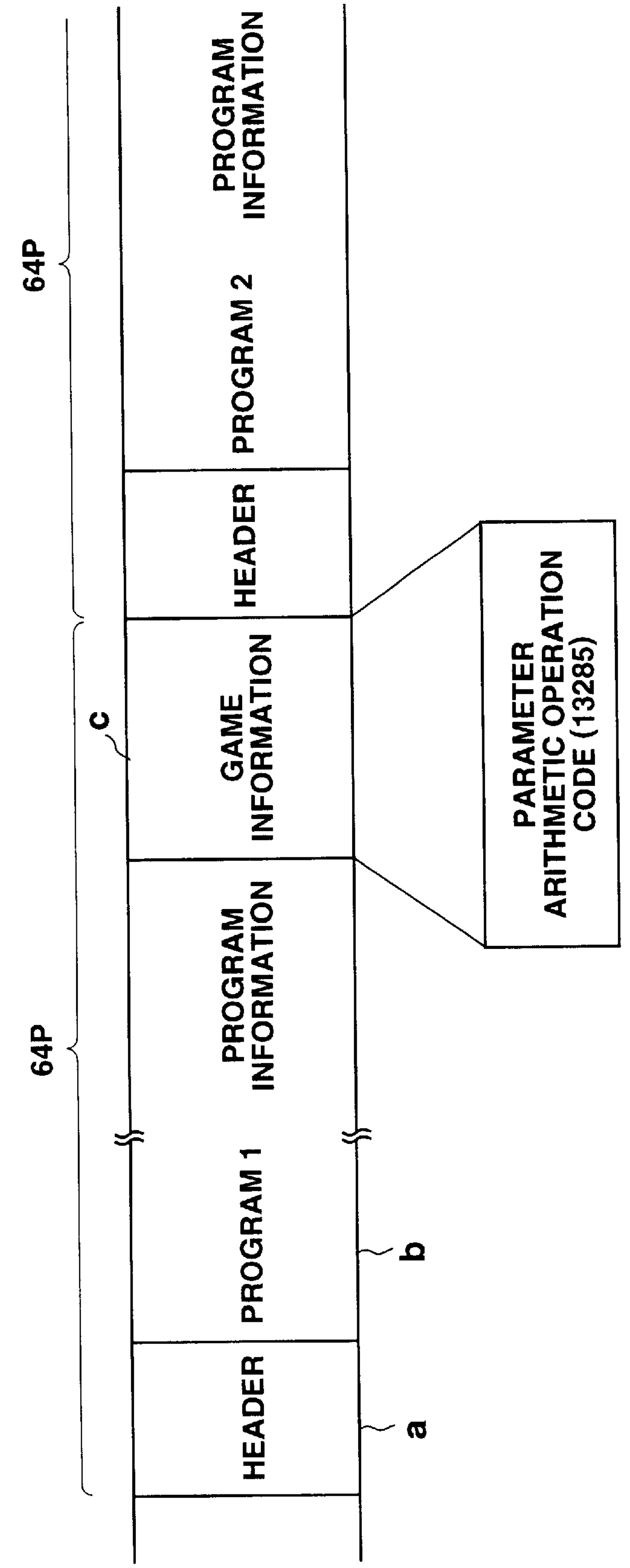
FIG. 6 is a diagram showing the transmission signal format of multiplex information.

FIG. 6 shows the transmission signal format of the multiplex information multiplexed on the FM broadcasting radio waves. The multiplex information contains multiplex programs 1 to N. Each multiplex program contains 64-page data. The multiplex information is transmitted in the state wherein the time data indicating the present year, month, day and the correct current time, measured by the timer 74, are interposed between predetermined multiplex programs. The header (first) page of each multiplex program contains header information "a". The header information "a" includes the table of contents and index of the programs, pay/free data, etc. The pay/free data specifies any one of the conditions wherein both the program information and game information included in the program are free, wherein both the program information and the game information are pay information, wherein the program information is pay information whereas the game information is free, and wherein the program information is free whereas the game information is pay information.

Pages 2 to 63 (or to Page 64) form the program information (first information) "b" of the program, while the last page forms the game information (second information) "c" of the program. The game information "c" contains a parameter (or parameters) and an arithmetic operation code which are used to advance a game. This arithmetic operation code indicates any one of the game functional formulas stored in the ROM 44, and has a value according to the type of the program, in other words, according to the program contains such as news, sports information and economic information. The game information "c" may contain END data. The END data is command data to terminate the game currently in progress. Some multiplex programs contain the game information "c", and some multiplex programs do not contain the game information "c". In the case of a multiplex program which does not contain the game information "c", Pages 2 to 64 form the program information "b".

FIG. 6 shows the transmission signal format of the multiplex information. When the receiver 1 is a pager, however, a format such as a FLEX format can be employed in the pager. The FLEX format, disclosed by International Patent Publication W093/25018, for example, is applicable to the present invention. Another representative format such as a POCSAG format can also be employed in the pager. The POCSAG format is disclosed by Published Unexamined Japanese Patent Application (Kokai) No. 1-286532, for example. The contents of these publication is incorporated into this specification by the reference.

Figure 7:
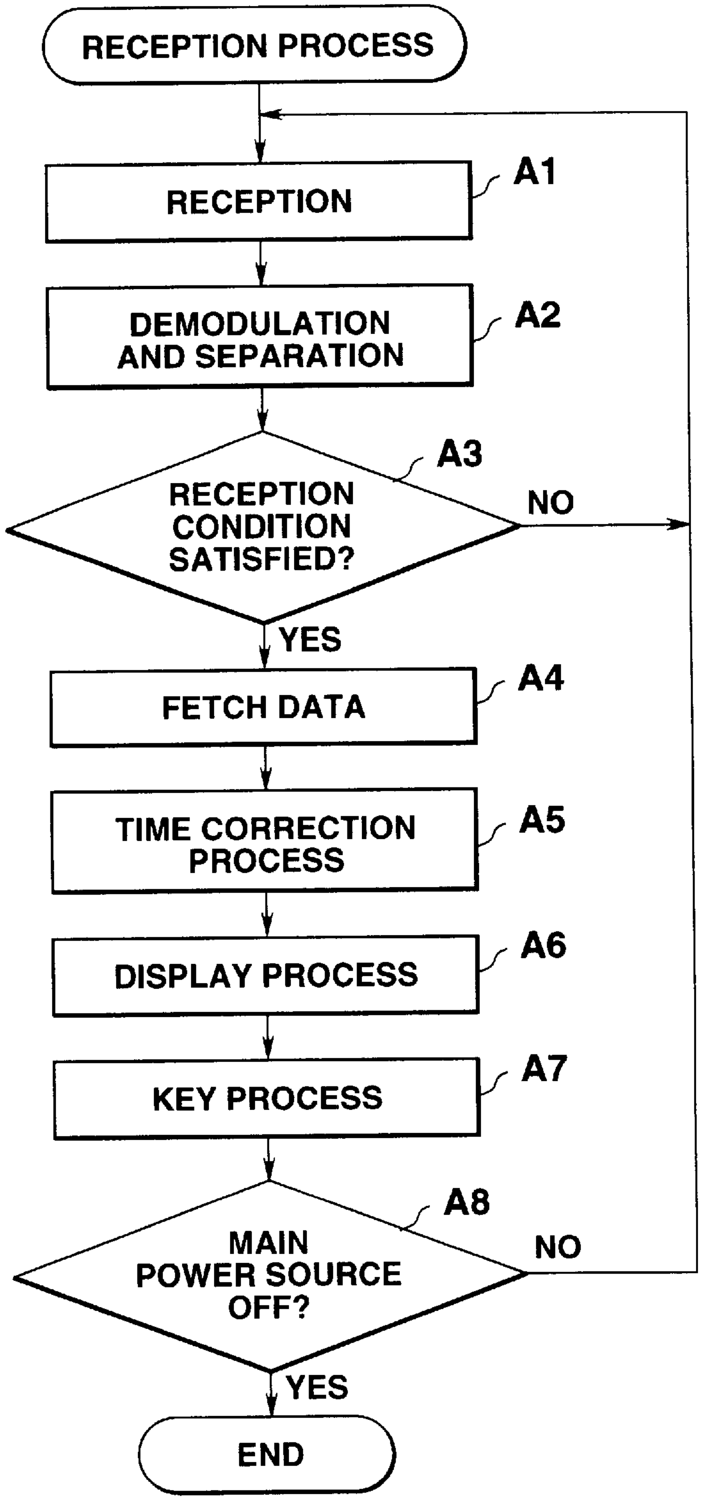
FIG. 7 is a flowchart explaining the steps by which a reception process is executed.

In the present embodiment having the above-described structure, the multiplex information of the format shown in FIG. 6 is multiplexed on the FM broadcasting radio waves, and is transmitted from the FM broadcasting station 3. Meanwhile, the receiver 1 operates in accordance with the flow of the reception process shown in FIG. 7. The receiver 1 (mainly, the antenna 31, the FM tuner 32, the FM demodulator 33, the control section 43 and the reception control section 50) receives the aforementioned FM broadcasting radio waves (step A1). The receiver 1 (mainly, FM demodulator 33, L-MSK demodulator 41 and the error correction decoder 42) performs demodulation and digital modulation and separates from the FM broadcasting radio waves the multiplex information multiplexed thereon (step A2). Thereafter, the receiver 1 (mainly the control section 43) determines whether a reception condition has been satisfied or not (step A3). The receiver 1 performs this determination by comparing the header information "a" with a reception condition preset in the receiver 1 and by determining whether there is a coincidence between the header information "a" and the preset reception condition.

More specifically, the header information "a" contains the pay/free information specifying whether each of the program information and the game information is pay or free information. Any one of reception conditions may be determined by the pay/free data preset in the receiver 1 as a result of a contract with the FM broadcasting station and the service center 2 or the insertion of a dedicated IC card in the receiver 1. The above-described reception conditions are those wherein all program information and game information are receivable, wherein pay program information and free game information are receivable, wherein free program information and pay game information are receivable, and wherein free program information and game information only are receivable. In the step A3, the receiver 1 compares the header information "a" with the preset reception condition, and goes to the step A4 only when there is a coincidence between them.

In the step A4, the receiver 1 (mainly the control section 43) fetches demodulated data. The program information "b" included in the demodulated data is stored in the program register 45*f*. The parameter contained in the game information "c" is stored in the parameter memory 45*a*. The arithmetic operation code contained in the game information "b) is stored in the arithmetic operation code memory 45*b*. Following this, the receiver 1 (mainly, the control section 43) carries out a time correction process (step A5), and corrects the time counted by the time counter 46 and stored in the time register 45*d*, based on the correct present year, month, day and time indicated by the time data transmitted from the FM broadcasting station. Accordingly, the time stored in the time register 45*d* changes in accordance with the peculiar clock timing which the time counter 46 provided in the receiver 1 counts. However, when the multiplex information is received, the time stored in the time register 45*d* is rectified to the correct time.

Following the time correction process, the receiver 1 (mainly, the control section 43) carries out a display process (step A6). In this process, the receiver 1 makes the display section 6 display the program information "b" such as news, sports information, and stock information, contained in the program received latest and stored in the program register 45*f*, or the receiver 1 makes the display section 6 display the program information of a program read out from the program memory 45*g* in response to a user's operation. Subsequently to this, the receiver 1 performs a key process (step A7). In this process, the receiver 1 fetches information associated with an operated key included in the key input section 5, and executes the corresponding processing. Until the main power source is turned off, the receiver 1 repeats the steps A1 to A8.

Figure 8:
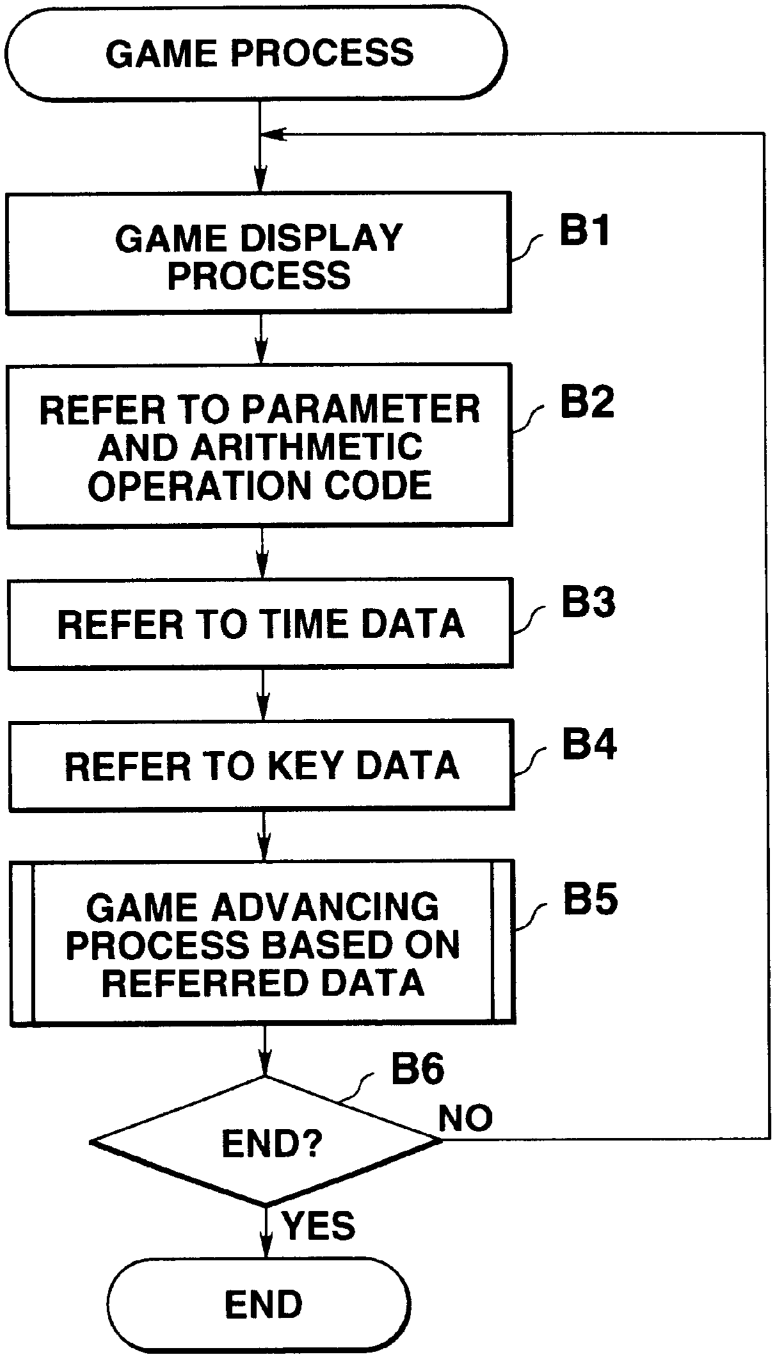
FIG. 8 is a flowchart showing the steps by which a game process is executed.

The main power source supplies electricity to the control section 43 of the receiver 1 while the main source of power is ON. While the main power source is OFF, the sub power source supplies electricity to the control section 43, and the game process shown in the flowchart of FIG. 8 is repeatedly executed. To be specific, a game display process is performed at first (step B1). In this process, display according to the state of the progress of the game is performed on the right-hand portion of the display section 6, based on the game process data stored in the game progress data memory 45*c*. Following this, the parameter stored in the parameter memory 45*a* and the arithmetic operation code stored in the arithmetic operation code memory 45*b* are referred to (step B2), the time data stored in the time register 45*d* is referred to (step B3), the key data fetched upon the operation of a key in the key input section 5 is referred to (step B4), and a game advancing process is executed based on those referred data (step B5). Next, it is determined whether the game information "c" contains the END data indicating the termination of the game (step B6). When the game information "c" contains the END data, the step B2, et. seq. are repeated. At the point the game information containing the END data has been received, the game process is terminated.

Figure 9:
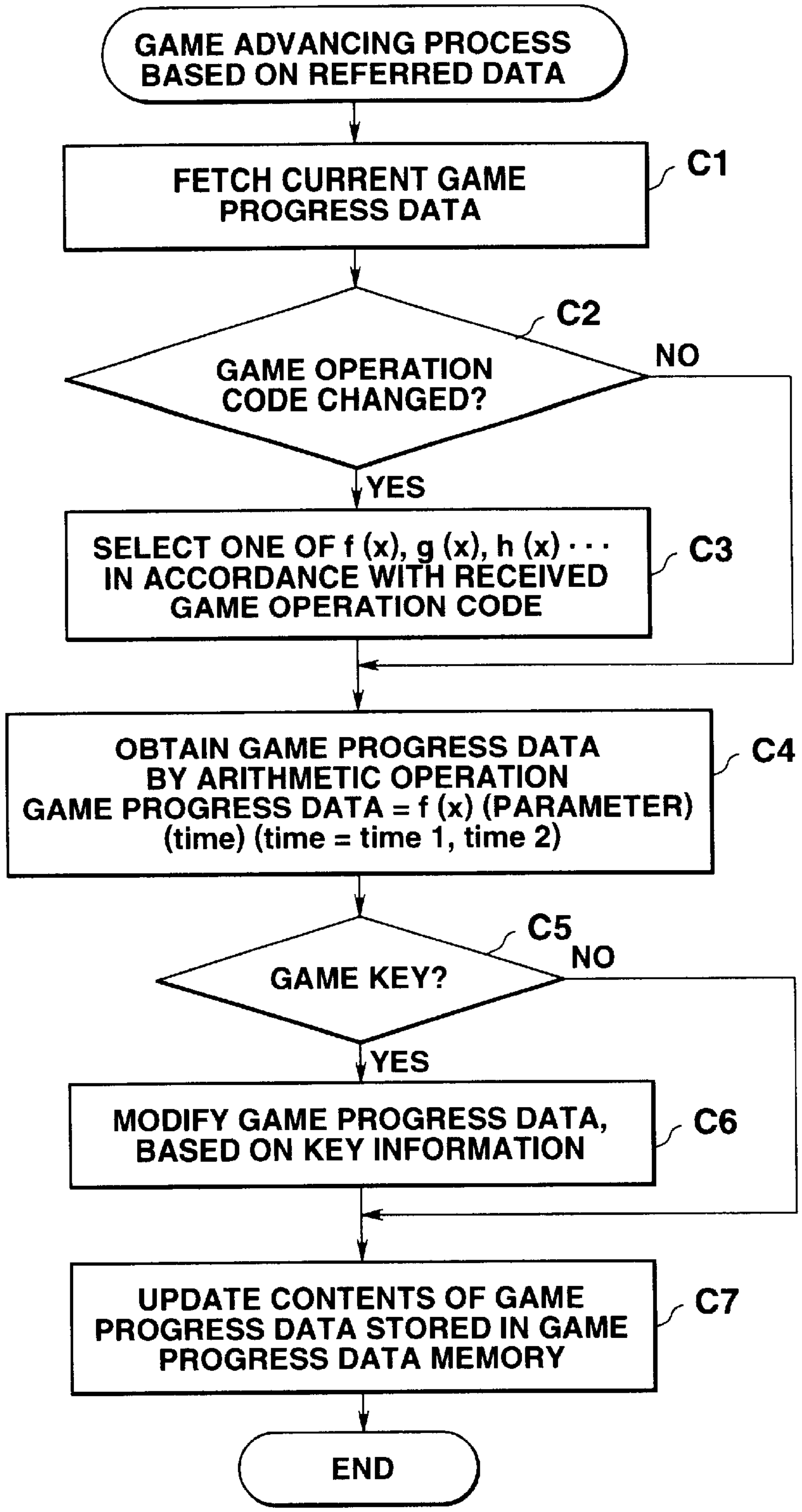
FIG. 9 is a flowchart showing the steps by which a game display process is executed based on referred data.

The game advancing process (step B5) based on the referred data mentioned above is carried out in accordance with the flowchart shown in FIG. 9, and the game progress data, stored in the game progress data memory 45*c* and which is display data for the game currently displayed on the display section 6, is fetched (step C1). The game operation code contained in the fetched game progress data is compared with a received game operation code, and it is determined whether there is any difference between both game operation codes (in other words, whether the game operation code to be used has been changed from one to another) (step C2). When it is determined that there is any difference between both game operation codes, one of the game functional formulas f(x), g(x), h(x) . . . stored in the ROM 44 is selected in accordance with the received game operation code (in accordance with the game operation code as changed).

Next, the game progress data is obtained by performing the following arithmetic operation:

game progress data=f(x).(parameter).(time)

where "f(x)" represents the game functional formula selected in the step C3. The symbol "x" is an arbitrary parameter. The "parameter" indicates the parameter received and stored in the parameter memory 45*a*, and the "time" indicates time 1 and/or time 2. As mentioned previously, time 1 is that counted by the time counter 46, stored in the time register 45*d* and corrected in accordance with the time information sent from the FM broadcasting station 3, while time 2 is that stored in the time register 45 and represents the time interval from when one of the Game keys 15 was operated up to when one of the Game keys 15 was operated again.

Thus, the game progress data obtained by step C4 contains not only the elements (the parameter and the arithmetic operation code) transmitted from the FM broadcasting station 3, but also the time elements (time 1, time 2). The value of the arithmetic operation code represents the type of a received multiplex program. The time element "time 1" is the time counted by the time counter 46 and corrected in accordance with the time information sent from the FM broadcasting station 3. Therefore, the peculiar time counted by the time counter 46 of the receiver 1 and the corrected accurate time are apparent from the game progress data. The time element "time 2" represents the time interval from when one of the Game keys 15 was operated up to when one of the Game keys 15 was operated again. Hence, from the game progress data, it is apparent whether the user has frequently operated the Game keys 15.

Subsequently to the step C4, it is determined whether any of the Game keys 15 has been operated (step C5). When it is determined that one of the Game key 15 has been operated, the game progress data is modified based on operated key information specifying the operated key (step C6). The game progress data obtained by the step C6 contains the elements transmitted from the FM broadcasting station 3 and the elements representing the type of the multiplex information received by the user, the receiver's peculiar time, the corrected accurate time, the time interval up to when one Game key 15 was operated, and the operation of the Game key 15.

In the next step C7, the game progress data obtained by the step C6 or C4 is added to the game progress data stored in the game progress data memory 45*c*, thereby updating the contents of the game progress data stored in the game progress data memory 45*c*. Therefore, in the case where the steps B1 to B6 of the game process shown in FIG. 8 are executed repeatedly, the game display process is carried out based on the updated game progress data in the step B1. Accordingly, the state of the progress of the game displayed on the right-hand portion of the display section 6 varies depending on the aforementioned elements transmitted from the FM broadcasting station 3 and the elements representing the type of the multiplex information received by the user, the receiver's peculiar time, the corrected accurate time, the time interval up to when one Game key 15 was operated, and the operation of the Game key 15.

Figure 10:
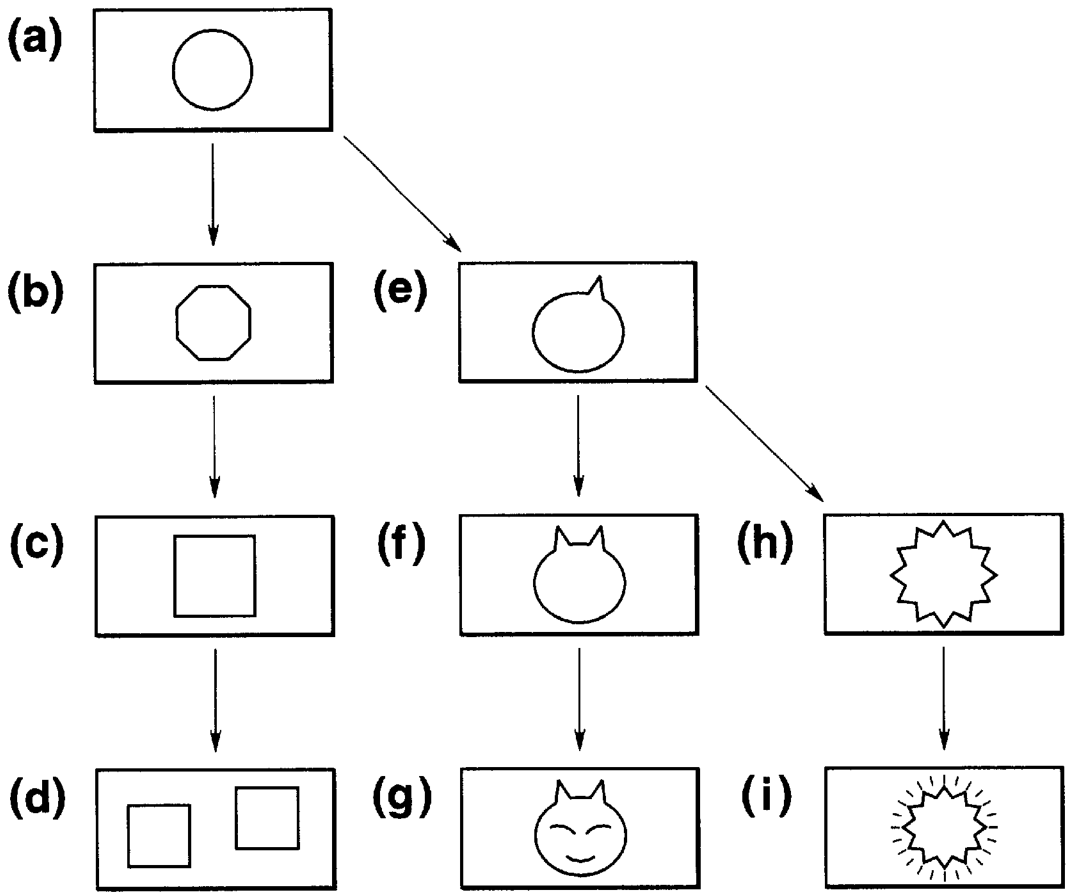
FIG. 10 is a diagram illustrating game display changing patterns.

The above-described matter will now be more specifically explained. FIG. 10 exemplifies changes in the game display (changes in the image displayed during the game). Let it be assumed that the image illustrated as (a) in FIG. 10 is displayed in the accordance with the game progress data based on the parameter and the game operation code received first and the time at which they were been received. Even in the case where the receivers 1 receive no multiplex program thereafter, changes occur in the values of time 1 and time 2, and accordingly changes take place in the displayed image (figure) as illustrated in FIG. 10 in the order of (b) to (d). At the point the time correction process (the step A1) has been executed, all receivers 1 are coincident with each other in the value of time 1. At other points in time, however, the receivers 1 may differ from each other in the value of time 1, due to a difference in clock period between the time counters 46 of the receivers 1. The images or figures displayed on the receivers 1 may not simultaneously change in the order of (b) to (d), and may change in the orders peculiar to the receivers 1 and at the timings particular to the receivers 1. Let it be assumed that one of the receivers 1 receives the multiplex information again. Then, changes occur in the parameter and the game operation code, and due to those changes, the displayed image or figure may change in the order of (a)–(e)–(f)–(g). If any of the Game keys 15 is operated at a given point in time, the displayed image or figure may change in the order of (a)–(e)–(h)–(l). Thus, gaming is various.

In short, it is not expectable how the game will progress, and the state of the game progress changes also in accordance with the passage of time. This can assuredly and permanently excite the desires for play which the users of the receivers 1 have. Further, character information is displayed on the left-hand portion of the display section 6 as a multiplex program. This can permanently excite also the users' desires for intelligence. Thus, both the user's desires for intelligence and the users' desires for play can be assuredly and permanently excited.

The users can send the figures displayed finally at the end of the game to the service center 2 or the FM broadcasting station 3 through utilization of the DTMF, personal computer communications and/or postcards, for example. In this case, prizewinners are determined in accordance with those figures, and goods according to prizes are provided to the users.

This embodiment has been explained exemplifying the FM teletext broadcasting and the pager system. However, the present invention is applicable also to the PHS (Personal Handyphone System). An area named a subaddress has been set in a PHS signal format. The PHS and the subaddress are disclosed by Published Unexamined Japanese Patent Application (Kokai) No. 8-274895, for example. The contents of the Published Unexamined Japanese Patent Application No. 8-274895 are incorporated in this specification by the reference. The "second information" recited in the "Summary of the Invention" can be sent using the subaddress. In this case, the parameters for controlling the progress of the game is transmitted from other receivers.

The present invention is applicable also to transmission/reception systems and receivers according to systems other than the PHS. Furthermore, the present invention is applicable also to portable telephones such as GSM, Cellular, PDC phones, etc., and pager systems like the POCSAG and the FLEX, etc.

The transmitting station 3 or the service center 2 may change the parameters or information for controlling the progress of the game, in response to any information or signals transmitted from the receivers 1. For example, the transmitting station 3 or service center 2 may change the parameters or information for controlling the progress of the game, in response to answers to questions included in the transmitted programs or the statistics of the answers.

Further, the transmitting station 3 or the service center 2 may receive the parameters or information for controlling the progress of the game, from any one of receivers 1, and multiplex the parameters or information on other information.

Moreover, in this embodiment, the first information and the second information are transmitted/received by radio waves. However, they can be transmitted/received through cables. Furthermore, in this embodiment, a transmission/reception system which employs the broadcasting method of transmitting information from one transmitting station to a large number of receivers simultaneously has been explained. However, the present invention is applicable also to a transmission/reception system and receivers according to the communication method of transmitting/receiving information only to/from one or more receivers having a specific ID code. Moreover, as explained in the embodiment, the game of the game means progresses when the display (image) on the display means changes in accordance with a predetermined element and time information. The game may not necessarily be such a type that one or more players have a match. A change in the state of the display (image) is not limited to a change in the shape or the like of the display (image) as in the case of this embodiment, and may be a change in the color of the display (image).

Thus, according to the present invention, as described above, the state of the progress of the game and the state of the display varies not only in accordance with the state of the reception of the second information transmitted from a transmitting station, but also in accordance with the time information. It is not expectable how the game will progress, and the state of the game progress changes also in accordance with the passage of time. This assuredly and permanently excites the users' desires for play. The transmitting station sends not only the second information, used to advance the game, but also the first information. The first information can permanently excite the users' desires for intelligence. Thus, according to the present invention, a system and receivers, which can permanently and assuredly excite both the users' desires for intelligence and the users' desires for play, can be realized.

What is claimed is:

1. A transmission/reception system comprising:

a transmitting station which transmits radio waves carrying first information, second information and information representing time; and at least one receiver which receives the radio waves transmitted from said transmitting station and demodulates said first information, said second information and said information representing time, said at least one receiver including:

a display, a time counter which generates first time information in response to a clock signal, a corrector which corrects the first time information generated by said time counter in accordance with the received information representing time, and generates second time information, and a game controller;

wherein said game controller progresses a game by changing an image displayed on said display, in accordance with a predetermined element obtained from the received second information, and time information, such that a state of the progress of said game varies in accordance with a state of the reception of said second information and said time information.

2. The transmission/reception system according to claim 1, wherein said time information is one of said first time information and second time information.

3. The transmission/reception system according to claim 1, wherein said radio waves are FM radio waves, and said first information, said second information and said information representing time are multiplexed on said FM radio waves.

4. The transmission/reception system according to claim 1, wherein said transmitting station has a service center, and receives said first information and said second information from said service center.

5. The transmission/reception system according to claim 4, wherein said at least one receiver further includes a sender which sends a reply information to said service center.

6. The transmission/reception system according to claim 1, wherein the number of receivers is plural, and said transmitting station receives said second information from one of receivers other than said at least one receiver.

7. The transmission/reception system according to claim 1, wherein said transmitting station is an FM radio broadcasting station, said at least one receiver is an FM teletext broadcast receiver, and said first information represents an FM teletext information program.

8. The transmission/reception system according to claim 1, wherein said at least one receiver is a pager, said transmitting station transmits said radio waves to said pager, and said first information represents a paging message.

9. The transmission/reception system according to claim 1, wherein at least one of said first information and said second information is pay information.

10. The transmission/reception system according to claim 1, wherein said first information is free information, and said second information is pay information.

11. The transmission/reception system according to claim 1, wherein said at least one receiver further includes a key input section inputting an element which changes the state of the progress of said game.

12. A transmission/reception system comprising:

a transmitting station which transmits radio waves carrying first information, second information and information representing time; and at least one receiver which receives the radio waves transmitted from said transmitting station and demodulates said first information, said second information and said information representing time, said at least one receiver including:

display means for displaying an image, time counting means for generating first time information in response to a clock signal, correction means for correcting the first time information generated by said time counting means, in accordance with the received information representing time, and for generating second time information, and display control means for controlling said display means;

wherein said display control means changes the image displayed on said display means in accordance with a predetermined element obtained from the received second information, and time information, such that a state of the image displayed on said display means varies in accordance with a state of the reception of said second information and said time information.

13. A transmission/reception system comprising:

a transmitting station which transmits radio waves carrying program information; and a receiver which receives the radio waves transmitted from said transmitting station and demodulates said program information, said receiver including:

display means for displaying an image, and game means for performing a game;

wherein said game means progresses said game by changing the image displayed on said display means, in accordance with a predetermined element obtained from the received program information, and time information, such that a state of the progress of said game varies in accordance with a state of the reception of said program information and said time information.

14. The transmission/reception system according to claim 13, wherein the state of the reception of said program information differs depending on which of a plurality of programs is received by said receiver.

15. The transmission/reception system according to claim 13, wherein the state of the reception of said program information differs depending on a time at which said program information has been received by said receiver.

16. A transmission/reception system comprising:

a transmitting station which transmits radio waves carrying first information and second information; and a receiver which receives the radio waves transmitted from said transmitting station and demodulates said first information and said second information, said receiver including:

a display, and a game controller which progresses a game by changing an image displayed on said display in accordance with a predetermined element obtained from the received second information, such that a state of the progress of said game varies in accordance with a state of the reception of said second information.

17. A receiver comprising:

a demodulator which receives radio waves carrying first information, second information and information representing time, and demodulates said first information, said second information and said information representing time, a display;

a time counter which generates first time information in response to an internal clock signal;

a corrector which corrects the first time information generated by said time counter in accordance with the received information representing time, and generates second time information; and a game controller;

wherein said game controller progresses a game by changing an image displayed on said display, in accordance with a predetermined element obtained from the received second information, and time information, such that a state of the progress of said game varies in accordance with a state of the reception of said second information and said time information.

18. The receiver according to claim 17, further comprising a key input section which inputs the element which changes the state of the progress of said game.

* * * * *